United States Patent [19]
Polidor et al.

[11] Patent Number: 5,690,417
[45] Date of Patent: Nov. 25, 1997

[54] SURFACE ILLUMINATOR WITH MEANS FOR ADJUSTING ORIENTATION AND INCLINATION OF INCIDENT ILLUMINATION

[75] Inventors: Edward T. Polidor, Webster; Albert G. Choate, Rush; Terry L. Herbeck, Rochester, all of N.Y.

[73] Assignee: Optical Gaging Products, Inc., Rochester, N.Y.

[21] Appl. No.: 645,382

[22] Filed: May 13, 1996

[51] Int. Cl.$^6$ ............................................. F21V 5/00
[52] U.S. Cl. .................. 362/244; 362/251; 362/800; 362/804; 359/387; 359/388
[58] Field of Search ........................... 362/251, 252, 362/244, 33, 800, 804, 32; 359/355, 387, 388

[56] References Cited

U.S. PATENT DOCUMENTS

| | | | |
|---|---|---|---|
| 4,567,551 | 1/1986 | Choate | 362/32 |
| 4,893,223 | 1/1990 | Arnold | 362/252 |
| 5,038,258 | 8/1991 | Koch et al. | 362/252 |

*Primary Examiner*—James C. Yeung
*Attorney, Agent, or Firm*—Shlesinger, Fitzsimmons & Shlesinger

[57] ABSTRACT

A plurality of light emitting diodes are secured coaxially around the lower end of a cylindrical objective lens housing in radially spaced, circular arrays or rings disposed coaxially of the housing. The diodes in each ring are equi-angularly spaced from each other about the axis of the housing; and their light emitting ends overlie a work table so as to direct beams of light obliquely downwardly onto an object supported thereon. The diodes are energizable in generally pie-shaped sectors disposed coaxially of the housing so that arcuate clusters of diodes in a given segment may be illuminated to enable the orientation of the resultant illumination to be varied. The diodes of each ring may have their beam axes inclined at different angles to the axis of the housing so that the inclination of the projected illumination may be varied by selected energization of the rings; and a collimating lens may be secured over the light emitting end of each diode.

9 Claims, 3 Drawing Sheets

SURFACE ILLUMINATOR WITH MEANS FOR ADJUSTING ORIENTATION AND INCLINATION OF INCIDENT ILLUMINATION

BACKGROUND OF THE INVENTION

This invention relates to surface illuminators designed to illuminate objects that are being inspected by contour projectors, optical comparators, microscopes and the like. Even more particularly this invention is related to an improved oblique surface illuminator having novel means for adjusting orientation and inclination of incident illumination directed onto an object.

As noted in U.S. Pat. No. 4,567,551, which is assigned to the same assignee as the instant application, proper illumination of an object which is being inspected is most important when the image of the object is to be magnified and observed by a lens system of the type employed in inspection systems of the type noted above. In the U.S. Pat. No. 4,567,551, for example, there is disclosed an oblique or multi-directional surface illuminator in which illumination is projected in a number of different directions onto the surface of the object which is to be inspected via an objective lens system. More specifically, this prior art apparatus comprises a plurality (four in the illustrated embodiment) of light sources arranged at 90° intervals around an objective lens housing to project light onto four registering, reflective surfaces, which are inclined to the axis of the lens housing to reflect illumination onto a Fresnel lens that surrounds the objective lens. The Fresnel lens then projects illumination obliquely onto the surface of the object that is to be inspected.

One of the principal advantages of this prior art system is that the light which is reflected onto the Fresnel lens is directed by the latter transversely of the image path of the object that is to be inspected. As a consequence the oblique rays from the Fresnel lens do not interfere with the light reflected directly from the object along the image axis. Although this prior art construction has the advantage that it permits the intensity of each of the four light sources to be adjusted as desired, nevertheless the orientation and inclination of incident illumination that is directed onto the object that is to be inspected, remain fixed.

It is an object of this invention, therefore, to provide an improved multi-directional surface illuminator which includes novel means for effecting adjustment of both the orientation and the inclination of incident illumination that is directed obliquely onto a workpiece that is to be inspected.

A more specific object of this invention is to provide an improved multi-directional surface illuminator having a plurality of light sources arrayed in such manner that the inclination of the angle of incidence can be readily adjusted simply by selectively energizing only certain of the light sources.

Still another object of this invention is to provide an improved multi-directional surface illuminator having a plurality of selectively energizable light sources arrayed in such manner as to enable adjustment of the orientation and angle of incidence of the illumination produced thereby.

Other objects of this invention will become apparent hereinafter from the specification and from the recital of the appended claims particularly when read in conjunction with the accompanying drawings.

SUMMARY OF THE INVENTION

An annular lamp housing, which is secured coaxially around the lower end of a cylindrical objective lens housing, contains a plurality of lamps arranged in radially spaced, circular arrays or rings disposed coaxially of the lens housing; and with the lamps in each ring being angularly spaced from each other about the axial centerline of the housings. The light emitting ends of the lamps overlie a work table so as to direct beams of light downwardly onto an object supported on the table. The lamps are controlled by circuits which are operable selectively to light the lamps in generally pie-shaped sectors disposed coaxially of the housings' centerline, whereby clusters of lamps in a given segment of a ring of lamps in a particular sector may be illuminated, thus enabling the orientation of the resultant illumination to be varied.

Also, in one embodiment the lamps of each ring have their beam axes inclined to the centerline of the housing so that the inclination of the projected illumination may be varied by selected energization of the rings of lamps. In other embodiments the lamps are mounted with their axes extending parallel to the centerline of the housing, and are directed by a Fresnel lens onto a workpiece. Also, a preferred lamp is a light-emitting diode (LED) of the type having a collimating lens secured over the light emitting end thereof.

THE DRAWINGS

FIG. 1 is a side elevational view of an improved surface illuminator having coaxially mounted on one end of its objective lens system an annular lamp housing containing a plurality of radially spaced, circular arrays of light sources, the angles of incidence of the beams emitted from these sources being shown as they appear when directed onto a workpiece that is shown in phantom by broken lines, and the lamp housing being shown partially in section as seen when taken along the line 1—1 in FIG. 2;

DETAILED DESCRIPTION OF THE PREFERRED EMBODIMENTS

Figure 1:
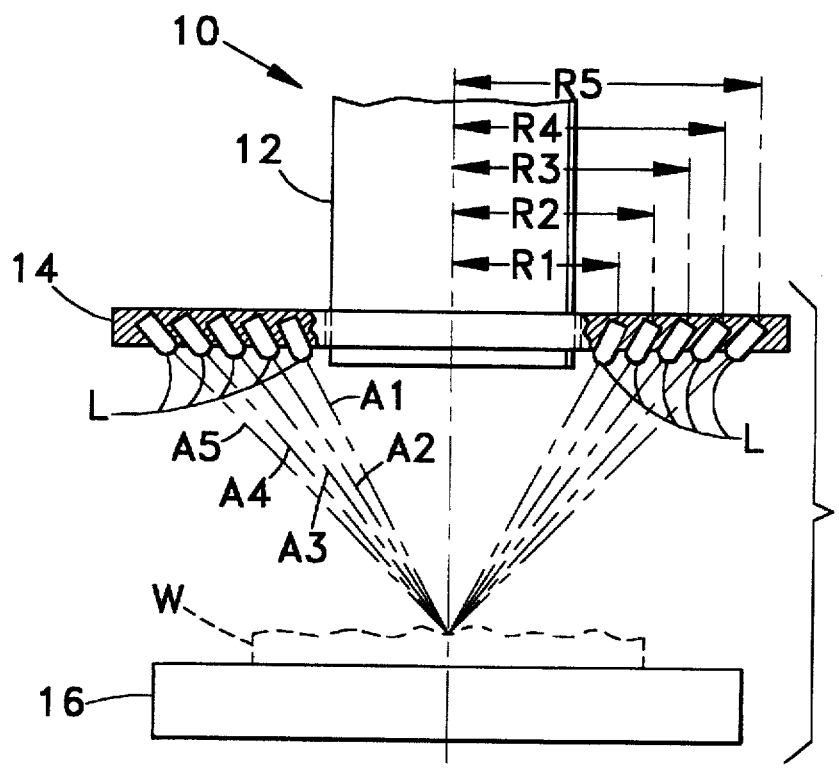
Figure 2:
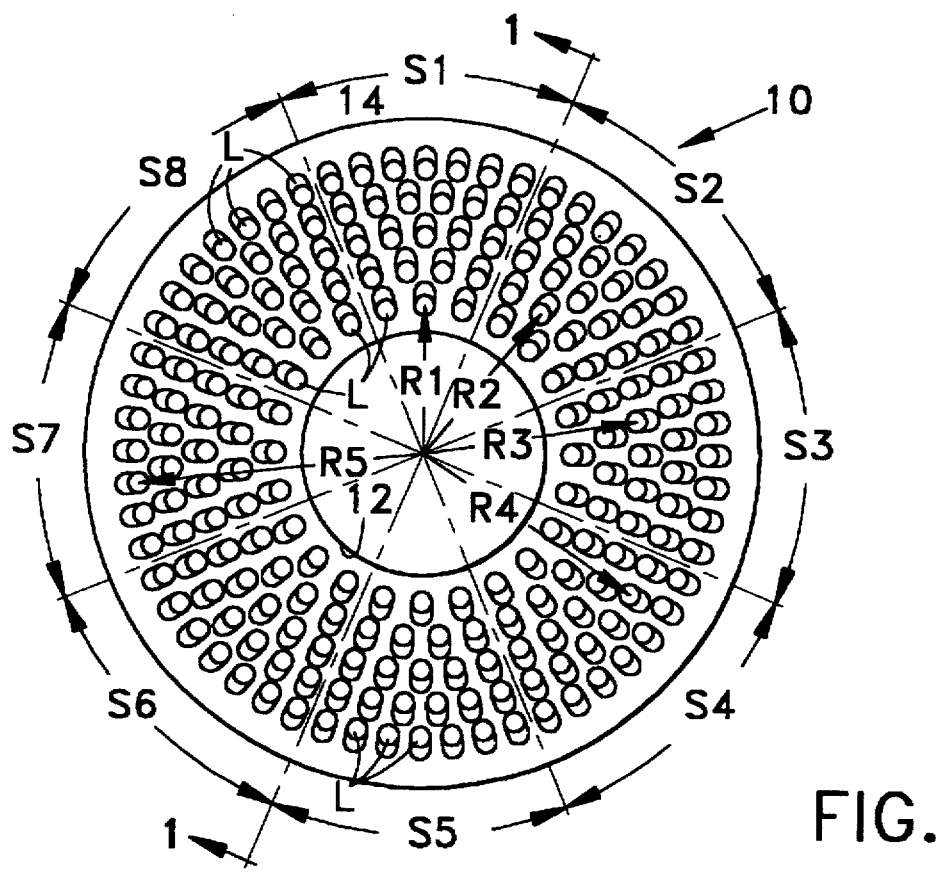
FIG. 2 is a bottom plan view of the surface illuminator and its objective lens system, and illustrating one manner in which the circular arrays of light sources can be considered to form eight, similar, pie-shaped sectors of illumination.

Referring now to the drawings by numerals of reference, and first to FIGS. 1 and 2, 10 denotes generally a surface illuminator of the type having a cylindrical lens housing 12 containing a conventional objective lens system (not illustrated). Secured to and surrounding the lower end of housing 12 is an annular, generally disc-shaped lamp supporting housing 14. Surface illuminator 10 is adapted to be mounted in a conventional manner above a work table 16, which, as shown in phantom by broken lines in FIG. 1, is adapted to have supported thereon the object or workpiece W which is to be inspected.

In the embodiment shown in FIGS. 1 and 2, housing 14 has mounted therein two hundred lamps L, which are secured or mounted at their inner ends in the housing 14, and which project at their outer, light emitting ends, downwardly from housing 14 toward a substantially common point in the object plane, and in the direction of the work table 16. As shown more clearly in FIG. 2, the lamps L are mounted in housing 14 in five circular arrays or rings disposed coaxially of the axial centerline of the housings 12 and 14. Adjacent arrays or rings of the lamps are equispaced radially from each other, and the respective lamps L in each circular array thereof are equiangularly spaced from each other about the axis of housings 12 and 14. Thus, as shown in the drawings, the innermost ring of lamps contains twenty-four equiangularly spaced lamps L, the light emitting ends of which lie in a circle at a radius R1 from the centerline of the lens housing 12. The next ring of lamps comprises thirty-two lamps the light emitting ends of which lie at a radius R2 from the housing centerline; the next array contains forty lamps disposed at a radius R3 from the centerline of the housing; the next outer ring comprises forty-eight lamps the light emitting ends of which lie on a circle located at a radius R4 from the centerline of the housing 12; and the last or outermost ring of lamps L comprises fifty-six lamps, the light emitting ends of which lie in a circle located at a radius R5 from the housing centerline.

Referring still to FIG. 2, it will be noted that, in addition to being mounted in housing 14 in circular arrays, the equispaced lamps L also can be, arbitrarily, divided into eight equiangular sectors identified as S1 through S8. These sectors, as noted hereinafter, are selected to enable selective illumination of certain of the lamps L in certain areas of the housing 14, so that illumination from the light sources can be directed selectively from different directions onto a workpiece W that is being inspected.

Figure 5:
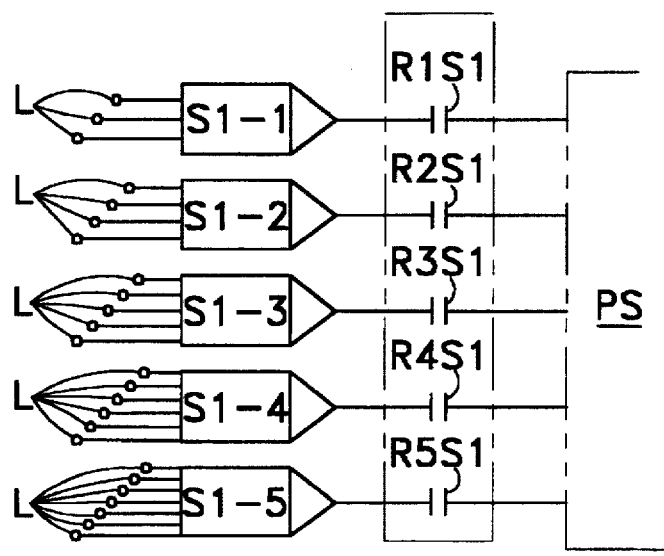
FIG. 5 is a schematic wiring diagram illustrating one manner in which arcuate clusters of light sources of a respective sector of illumination can be selectively energized.

For example, as shown in FIG. 5, the lamps in sector S1 are controlled by five different circuits denoted S1-1, S1-2, S1-3, S1-4 and S1-5. Those circuits are connected through switches R1S1, R2S1, R3S1, R4S1 and R5S1, respectively, to a power supply which is denoted at PS in FIG. 5. The switches R1S1 through R5S1 are shown in their normally-opened mode. Whenever any one of those switches is closed, the power is supplied to the associated circuit S1-1 through S1-5, and thereby energizes the associated lamps L, which in the case of the circuit S1-1 will energize all three of the lamps L connected in parallel therewith, and which happen to be located at the distance R1 from the centerline of housing 14. In a similar manner the lamps controlled by circuits S1-2, S1-3, S1-4 and S1-5 can be selectively energized. Although FIG. 5 has been explained in connection with only section S1 of the lamps L shown in FIG. 2, it will be understood that seven similar such circuits will be utilized for selectively energizing the lamps L in each of the seven remaining sectors S2 through S8.

Figure 6:
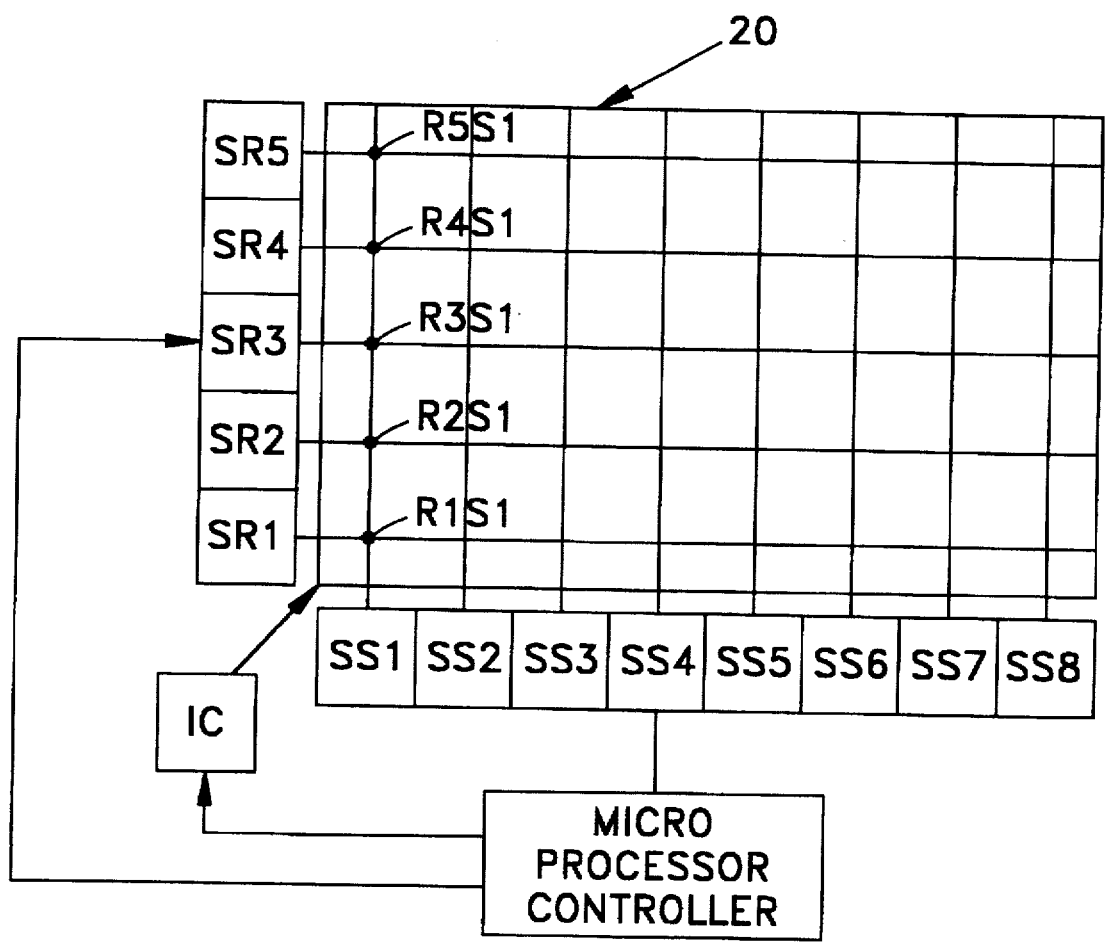
FIG. 6 is a schematic diagram illustrating one manner in which selective illumination of the light sources may be controlled.

For example, as shown in FIG. 6, the illustrated microprocessor/controller can be utilized for selectively supplying power to a selected group of lamps in each of the sectors S1 through S8. As shown in FIG. 6, SS1 through SS8 illustrate manually operable switches, any one or more of which can be closed manually by an operator to select a particular sector, certain lamps of which (for example a cluster of lamps) are to be energized. SR1 through SR5 denote manually operable switches which can be selectively closed to denote the particular ring of lamps a particular segment or cluster of which lamps in a given sector are to be energized, each such cluster being located at one of the radial distances R1 through R5 from the centerline of the housing. The switches SS1 through SS8, and the switches SR1 through SR5, when closed, are designed to apply a signal to a switching matrix denoted generally by the numeral 20 in FIG. 6. As noted diagrammatically by matrix 20, the simultaneous closing or selection of the switches SS1 and SR1 are designed to apply a signal which closes switch R1S1 (FIG. 5) to supply power to the cluster of lamps L which are located in sector 1 at a radial distance R1 from the centerline of housing 14. Obviously if all of the switches SR1 through SR5 were closed simultaneously with switch SS1, all lamps L in the sector S1 would be illuminated. However, selective operation of the switches SR1 through SR5 at a time when the switch SS1 is closed, will provide selective energization of one or more of the five clusters of lamps located in sector 1.

Although not described in detail above, it will be apparent that similar switching effects for each of the remaining sectors S2 through S8 can be achieved by selective operation of the switches SS2 through SS8, and the particular switches which select the desired circular array—i.e., switches SR1 through SR5.

In FIG. 6 the microprocessor/controller is designed also to control the intensity of the illumination emitted by the lamps L. For this reason a circuit denoted at IC in FIG. 6 can be controlled by the controller to function as a global intensity control, so that the overall intensity of the illumination from lamps L can be controlled as desired. Thus, when employing an array of lamps as shown in FIGS. 1 and 2, and as controlled by the means shown in FIGS. 5 and 6, it is possible to control the orientation of the illumination around the object that is being inspected.

In addition to being able to vary the orientation of the illumination that is directed on the object that is to be inspected, it is possible also selectively to vary the angle of inclination of the illumination that is directed onto a workplace. For example, as shown in FIG. 1, although each of the five rings or circular arrays of lamps L that surround the lens housing 12 is radially spaced a different distance from the centerline of the housing, the axial centerlines of the five rings, A1 through A5, respectively, are inclined at different angles to the axial centerline of the lens housing. In the embodiment illustrated, it will be noted that the angle of incidence is least for the beam of light centered upon axis A1, and is the greatest for the beam transmitted along the axis A5. Thus, by selectively energizing the lamps L in each of the arrays R1 through R5, it is possible to vary the angle of inclination of illumination directed onto the workpiece W. With the embodiment shown in FIG. 1, therefore, it is possible selectively to vary both the orientation and the inclination of the light directed onto the workpiece W. Obviously the respective angle of inclination of the illumination directed onto the workpiece by the lamps L in a respective ring or array corresponding R1, R2, R3, R4 or R5, can be varied, as desired, simply by mounting associated lamps L in the housing 14 so that the axes of the light beams emitted therefrom form the desired angle of incidence with the workpiece that is being examined.

Figure 3:
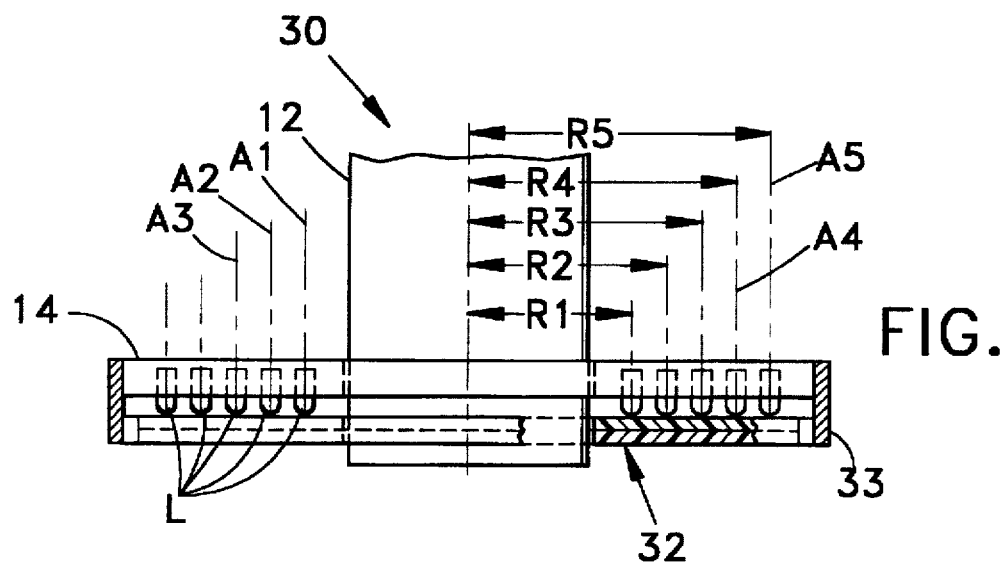
FIG. 3 is a modified form of the surface illuminator shown in FIG. 1, but with portions thereof cut away and shown in section.

Referring now to the embodiment as shown in FIG. 3, wherein like numerals are employed to denote elements similar to those shown in the first embodiment, 30 denotes generally a modified illuminator in which the five circular arrays or rings of lamps L, again denoted by the designations R1 through R5, are mounted in housing 14 with their axes A1 through A5 extending parallel to the axis of the lens housing 12, rather than being inclined thereto. This construction has the advantage that the lamps L can be simply mounted in a common plane in housing 14. An additional difference in this embodiment is that the modified illuminator 30 has an annular Fresnel lens 32 mounted beneath the lower light emitting ends of the lamps L, and coaxially of the lens housing 12. Fresnel lens 32, which may be generally of the type employed in the above-noted U.S. Pat. No. 4,567, 551, is secured around its outer peripheral surface in the lower end of a circular clamp or ring 33, the upper end of which is secured to the outer peripheral surface of housing 14, so that lens 32 is supported beneath and in registering relation with the lamps L in the illuminator 30. As noted in the U.S. Pat. No. 4,567,551 lens 32 can be made from two identical, annular plastic or glass elements having grooved sides thereof cemented together. With this construction the Fresnel lens 32 can be designed so that it redirects the illumination from the numerous lamps L in the illuminator 30 downwardly in FIG. 3 toward a workpiece (not illustrated) in a manner similar to that shown in FIG. 1.

Figure 4:
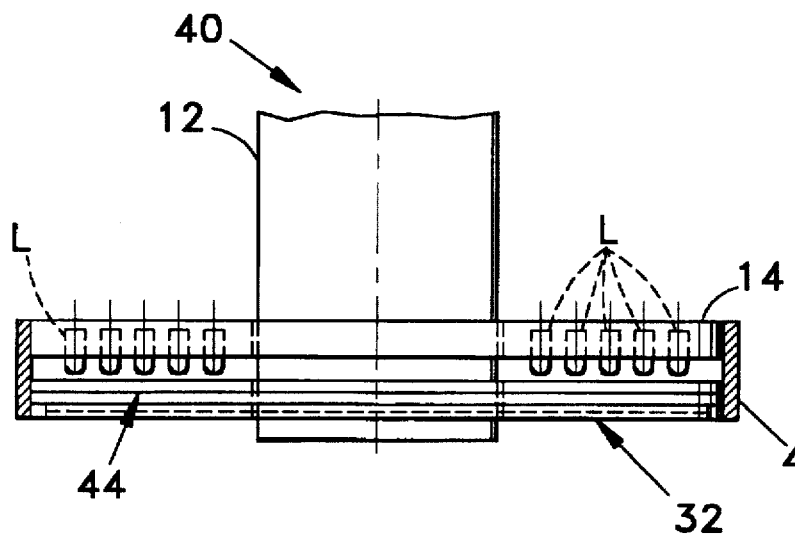
FIG. 4 is a view similar to FIG. 3 but showing still another modification of this surface illuminator.

Referring now to the embodiment shown in FIG. 4, 40 denotes generally still another form of surface illuminator comprising a lamp supporting housing 14, again secured coaxially on the lens housing 12 adjacent the lower end thereof, and containing a plurality of lamps L which are mounted in housing 14 in a manner similar to those shown in FIG. 3—i.e., with the axial centerlines of their beams extending parallel to the axis of the lens housing 12. Also as in the embodiment shown in FIG. 3, a ring clamp 43 is secured coaxially at its upper end around the outer peripheral surface of housing 14, and projects axially downwardly beneath housing 14 and has secured in its lower end a Fresnel lens 32. Also mounted within ring 43 between the Fresnel lens 32 and the lower ends of the lamps L is an annular diffusing element 44, which lies in a plane spaced slightly above and parallel to lens 32, and slightly beneath the lower ends of the lamps L in the illuminator 40. The advantage of using the diffusing element as shown in FIG. 4 is that it makes the illumination, which is directed at the work (not illustrated), more uniform both angularly and spacially.

One of the preferred types of lamps L employed in the foregoing embodiments is of the type known as a light emitting diode (LED) which has a collimating lens molded over the output end of the lamp—i.e., the end of the lamp L directed toward the workpiece W, as shown for example in FIG. 1, and corresponding to the lower ends of the lamps L as shown in FIGS. 3 and 4. Each lamp thus serves as a source of essentially collimated light with small angular spread from the axial centerline of the light beam, for example in the range of 7°. In those embodiments in which the Fresnel lens is employed, such beams are then redirected and focused onto the object plane (the plane of the workpiece) by the Fresnel lens. LED's of the type described are offered for sale by Hewlett Packard under the designation HLMA-CHOO/-CLOO.

It will be apparent to one skilled in the art however, that other light sources, such as for example light pipes, conventional incandescent lamps, or similar beam-emitting devices, with or without associated collimated lenses can be employed without departing from this invention. Moreover although in the illustrated embodiments only five circular arrays of lamps have been illustrated, it will be readily apparent that any number of circular arrays can be employed and the overall number of lamps employed can be increased or decreased without departing from this invention. For example, the number of lamps employed in a surface illuminator of the type described above may include circular arrays ranging from R1 to any desired upper limit RN, while the number of sectors likewise could range anywhere from S1 to any desired upper limit as SN. Likewise, if desired, the angular spacing of adjacent lamps in an array thereof need not be equiangular, nor need the arrays be equispaced radially from each other.

While this invention has been illustrated and described in detail in connection with only certain embodiments, it will be apparent that it is capable of still further modification, and that this application is intended to cover any such modifications as may fall within the scope of one skilled in the art or the appended claims.

We claim:

1. A surface illuminator, comprising a first housing having therein an axial bore containing means for projecting through said bore the image of an object located in a predetermined position beyond one end of said first housing, a second housing surrounding said first housing and having an open end disposed coaxially of and adjacent to said one end of said first housing a plurality of collimated light sources each having a light emitting end, said light sources being mounted in said second housing in spaced relation to each other, and with said light emitting ends thereof disposed in radially spaced circular arrays surrounding said first housing coaxially of said bore, and lying in a common plane extending normal to the axis of said bore, each of said sources being operative, when energized, to direct a beam of light substantially parallel to said axis and toward the open end of said second housing, a Fresnel lens mounted in said open end of said second housing in confronting relation to the light emitting ends of said light sources whereby the light beams from said sources pass through said Fresnel lens and are thereby redirected toward and focused onto said object in said predetermined position, and control means for selectively energizing said light sources, thereby to control the amount and orientation of the illumination directed by said Fresnal lens onto said object.

2. A surface illuminator as defined in claim 1, wherein said control means includes a plurality of electrical circuits each of which controls a predetermined number of adjacent light sources in each of said arrays thereof, each of said circuits includes switch means operable selectively to energize in one or more of said arrays said adjacent number of light sources controlled thereby, said predetermined number of adjacent light sources in each array controlled by a respective circuit increases progressively from a minimum number for the radial innermost of said arrays to a maximum number for the radial outermost of said arrays.

3. A surface illuminator as defined in claim 2, wherein said predetermined minimum and maximum numbers of adjacent light sources in an array thereof are the same for each of said circuits.

4. A surface illuminator as defined in claim 2, wherein each of said circuits for a respective one of said arrays controls an equal number of said light sources, and the light beams emitted by the arrays of light sources controlled by said circuits are arranged in generally pie-shaped sectors.

5. A surface illuminator as defined in claim 1, including a light diffusing element interposed between said light sources and said Fresnel lens.

6. A surface illuminator as defined in claim 1, wherein said light sources comprise light emitting diodes having the light emitting ends thereof disposed in said common plane, and each of said light emitting diodes has a collimating lens secured over the light emitting end thereof.

7. A surface illuminator as defined in claim 1, wherein said circular arrays are radially spaced equal distances from each other, and the light sources in each of said arrays are equi-angularly spaced from each other about the axial centerline of said bore.

8. A surface illuminator as defined in claim 7, wherein the total number of light sources in each circular array increases progressively from the radial innermost to the radial outermost of said arrays.

9. A surface illuminator as defined in claim 1, including means for selectively adjusting the global intensity of said light sources.

* * * * *